April 16, 1940.  W. J. COULTAS ET AL  2,197,265
WHEEL MOUNTING
Filed July 8, 1939
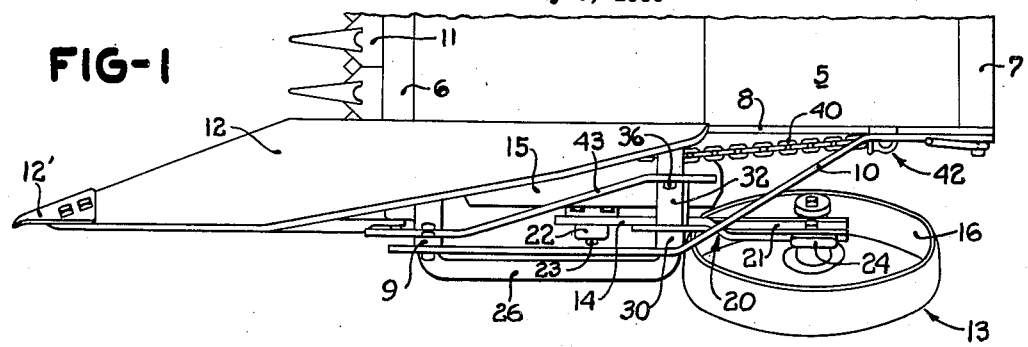
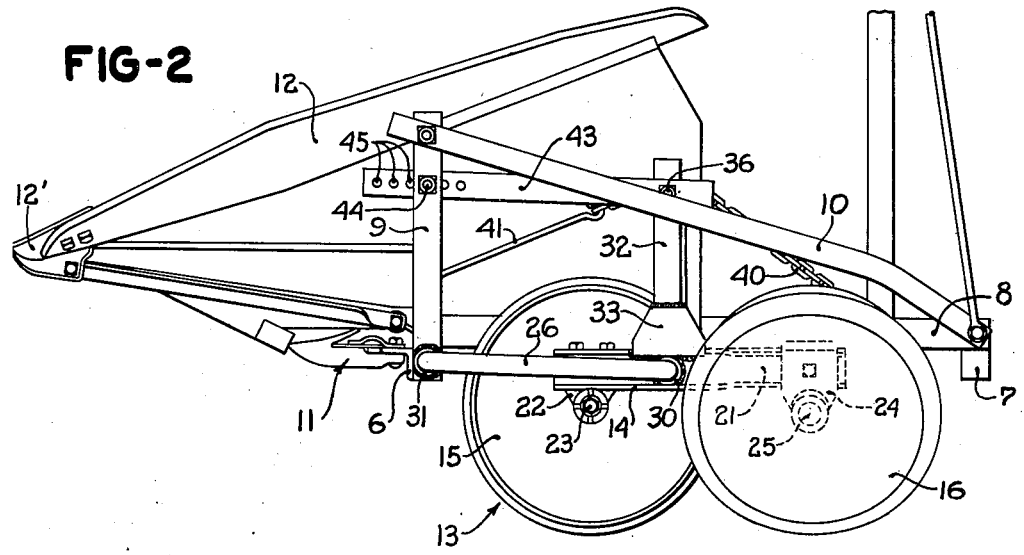
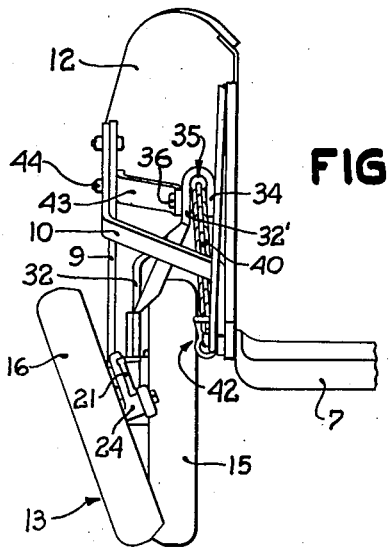
INVENTORS
WILBUR J. COULTAS
ELLSWORTH T. JOHNSON
BY
ATTORNEYS.

Patented Apr. 16, 1940

2,197,265

UNITED STATES PATENT OFFICE 2,197,265

WHEEL MOUNTING

Wilbur J. Coultas and Ellsworth T. Johnson, Moline, Ill., assignors to Deere & Company, Moline, Ill., a corporation of Illinois Application July 8, 1939, Serial No. 283,375

6 Claims. (Cl. 280—80)

The present invention relates generally to wheel mountings for agricultural implements and has for its principal object the provision of a wheeled truck for supporting the outer end of the laterally extending platform of harvesters and binders, which is adapted to ride over irregular, furrowed land with a minimum of bumps and jars; which is capable of traveling over soft ground without sinking in to any appreciable extent; and which has a narrow track disposed well inside of the divider point so that no standing grain is trampled or run over. We accomplish this object by providing the truck with a pair of overlapping longitudinally spaced wheels of relatively large diameters which are inclined at an angle to one another whereby the bottoms of the wheels are spaced closer together than are the tops, and the rear wheel runs substantially in the track of the front wheel. The two wheels are each disposed normally in engagement with the ground, supporting the truck at two points spaced longitudinally of the line of advance of the implement and comparatively close together, whereby when one of the wheels passes over a ditch, the truck will be supported on the other wheel.

Other objects and advantages will be made apparent upon consideration of the following detailed description of a preferred embodiment of our invention, reference being had to the appended drawing, in which Figure 1 is a fragmentary plan view of the grainward end of a binder platform supported on a wheeled truck embodying the principles of our invention;

Figure 2 is a side elevation of the same; and

Figure 3 is a rear end view, showing the angular relation between the two wheels.

Referring now to the drawing, reference numeral 5 indicates the outer end of the laterally extending platform of a grain binder. The platform may be of any conventional form and is mounted on front and rear transverse frame members 6 and 7, respectively, which are connected at their outer ends by a cross member 8, and by bracing members 9 and 10. Carried on the leading edge of the front frame member 6 is a cutter bar 11, and mounted on the outer end of the platform is the usual divider 12 having a divider point 12'.

The outer end of the platform 5 is supported on a two-wheeled truck, indicated in its entirety by the reference numeral 13 and comprising a wheel supporting member 14 on which are journaled the two ground wheels 15 and 16. The wheel supporting member 14 is preferably in the form of a short length of I-beam extending in a fore and aft direction, and having a twist at 20 causing the rear half 21 of the beam to lie in a plane inclined to the vertical. Clamped to the front end of the member 14 is a bearing bracket 22 in which is journaled the transversely extending axle 23 of the front wheel 15. A second bearing member 24 is clamped to the inclined rear end of the supporting member 14 and rotatably receives the rear wheel axle 25 at an angle corresponding to the inclination of the rear end portion 21. Thus, the rear wheel 16 rotates in a plane inclined to the vertical, and contacts the ground at a point substantially in the track of the front wheel 15, the wheels being in overlapping arrangement when viewed from either the side or the rear.

The wheel supporting member 14 is connected with the platform 5 for vertical movement relative thereto by means of a U-shaped crank axle 26, one arm of which is journaled in a transverse tubular bearing member 30 welded to the outer side of the beam 14 ahead of the twist 20, and the other arm of which is journaled in a tubular bearing member 31 welded to and extending laterally from the lower end of frame member 9.

Vertical adjustment of the truck 13 relative to the platform 5 for the purpose of raising or lowering the platform with respect to the ground, is accomplished through an arm 32 fixed, as by welding, to the top of the beam 14 directly above the tubular bearing 30, and extending upwardly therefrom. A gusset plate 33 gives extra strength and rigidity to the joint between the arm 32 and beam 14. The upper portion of the arm 32 is offset inwardly, as at 32', and the end is bent downwardly at 34 to form an inverted U. A roller 35 is disposed between the arms 33, 34 and is journaled on a bolt 36 passed through aligned holes in the arms. A chain 40 is trained over the roller 35 and is hooked to the rear end of a link 41, the front end of the link being suitably anchored to the platform frame. The other end of the chain 40 is adapted to be adjustably fastened at 42 to the frame cross member 8, and the platform 5 is raised or lowered relative to the truck 13 by shortening or lengthening the chain, as the case may be. Shortening the chain 40 has the effect of straightening the angle described by the chain as it passes over the roller 35 and causes a downward force to be exerted on the latter.

The platform 5 is maintained at the proper angle relative to the ground by means of a radius rod 43 which is secured at one end to the vertical arm 32 by the bolt 36 and is adjustably secured at the other end to the frame member 9 by a bolt 44 adapted to pass through any of several holes 45 spaced along the end of the radius rod. In the drawing, the platform 5 is shown as adjusted level with respect to the ground, and to tilt the platform forwardly would necessitate passing the bolt 44 through one of the holes 45 nearer the front end of the radius rod 43. Likewise, the platform is adjusted to tilt rearwardly by passing the bolt 44 through one of the holes 45 farther back along the radius rod.

In operation, the divider point 12' extends outwardly well beyond the track of the wheels 15, 16 and gathers the standing grain in to the cutter bar 11, leaving only stubble for the wheels to run over. Inasmuch as the divider 12 is effective for clearing only a relatively narrow swath for the wheels, it follows that the track of the wheels must be correspondingly narrow to avoid trampling over standing grain beyond the reach of the divider point. This is effectively accomplished by inclining the rear wheel as shown and described herein. At the same time, the platform is carried over ditches or depressions substantially without jarring, by the overlapping wheel arrangement whereby either wheel is adapted to carry the full load when the other wheel passes over a ditch.

What we claim as our invention is:

1. In an implement, a supporting member, a pair of wheels journaled on said member in overlapping relation for rotation about axes disposed in fore and aft spaced relation to each other, one of said wheels being disposed to rotate in a vertical plane and the other wheel being disposed to rotate in a plane inclined to the vertical.

2. An implement wheel mounting comprising a supporting member, and a pair of wheels adapted to be journaled on said member in fore and aft spaced overlapping relation, the axes of said wheels being arranged at an angle to one another whereby the wheels rotate in planes disposed in downwardly converging relation, said wheels engaging the ground approximately in line with the direction of travel of the implement whereby the rear wheel runs substantially in the track of the front wheel.

3. An implement wheel mounting comprising a supporting member, and a pair of wheels adapted to be journaled on said member in fore and aft spaced overlapping relation, the axes of said wheels being arranged so that one of said wheels rotates in a vertical plane and the other of said wheels rotates in an inclined plane, said planes intersecting substantially at the surface of the ground whereby the rear wheel runs approximately in the track of the front wheel.

4. In an implement, a supporting member, front and rear wheels journaled on said member in overlapping relation for rotation about axes disposed in fore and aft spaced relation, said front wheel being disposed to rotate in a vertical plane, and said rear wheel being disposed to rotate in an inclined plane, said wheels engaging the ground at substantially longitudinally aligned points.

5. A wheel mounting for an implement having a frame, comprising a supporting member, means connecting said member with said frame providing for vertical movement relative thereto, a pair of wheels adapted to be journaled on said member in fore and aft spaced overlapping relation, the axes of said wheels being arranged at an angle to one another whereby the wheels rotate in downwardly converging planes, said wheels engaging the ground at substantially longitudinally aligned points whereby the rear wheel runs in the track of the front wheel, and means for raising and lowering said wheel mounting with respect to said frame.

6. In combination, a wheel supporting member and a pair of wheels journaled thereon for rotation about axes spaced fore and aft and displaced angularly relative to each other, said wheels being in overlapping relation when viewed either from the side or from the rear.

WILBUR J. COULTAS.
ELLSWORTH T. JOHNSON.